Figure 1:
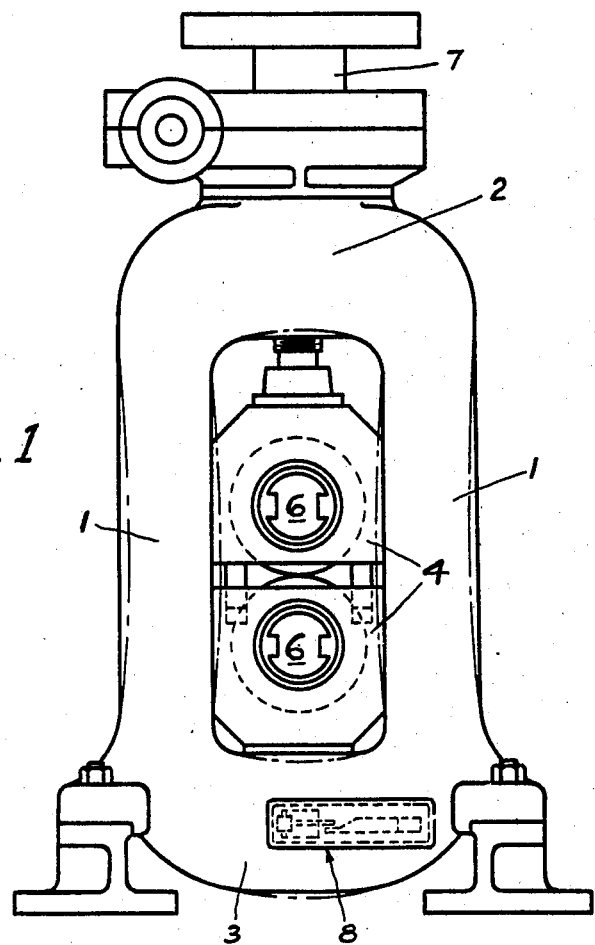

March 17, 1942.    S. J. A. M. BAGNO    2,276,817
STRAIN GAUGE
Filed Aug. 24, 1939    2 Sheets-Sheet 1

INVENTOR
Samuel J. A. M. Bagno
by J. E. Dickinson
his attorney

March 17, 1942.   S. J. A. M. BAGNO   2,276,817
STRAIN GAUGE
Filed Aug. 24, 1939   2 Sheets-Sheet 2

INVENTOR
Samuel J. A. M. Bagno
by J. E. Dickinson
his Attorney

Patented Mar. 17, 1942

2,276,817

UNITED STATES PATENT OFFICE 2,276,817

STRAIN GAUGE

Samuel J. A. M. Bagno, New York, N. Y., assignor to United Engineering and Foundry Company, Pittsburgh, Pa., a corporation of Pennsylvania Application August 24, 1939, Serial No. 291,691

2 Claims. (Cl. 265—1)

This invention relates to the measuring of strains or pressures on frame structures by instruments responsive to the deflection of such structures under strain, and is particularly applicable to the measuring of roll pressures in rolling mills.

It is customary practice to measure such roll pressures by measuring the stress imparted thereby to the roll housings. This stress causes the side members of the housings to become strained, elongated or deflected, and this distortion is measured by a strain gauge. One of the most satisfactory types of gauges for this purpose is an electromagnetic gauge provided with movable circuit-controlling means that the distortion of the roll housing displaces, causing a variation in the pathway of the magnetic flux and consequently a change in the reluctance of the magnetic circuit and a change in the distribution of the magnetic flux. These variable factors induce a variable electric current in a metering circuit calibrated in pounds pressure.

Heretofore, strain gauges have been mounted on roll housings in such a way that they respond to the above-mentioned distortion of the upright side posts of the housings. However, especially in hot rolling, the housing posts are elongated not only by the roll pressure, but also by the radiated and conducted heat from the high temperatures of the associated rolls and hot work pieces. The strain gauge readings are not always as accurate as desired, because they are not true indications of pressure only. This inaccuracy is due less to the direct thermal elongation of the housing posts than it is to the bowing of the side posts due to one-sided heating. To remedy this condition attempts have been made to insulate the housings, to adjust the gauges to compensate for thermal expansion, etc., but none of these things has been entirely satisfactory. It is especially desirable to have accurate readings to aid in the adjustment of the roll axes to bring them into parallel relation, more particularly when the allowable tolerances for the rolled material are small.

It is among the objects of this invention to provide for a high degree of accuracy in the measurement of the roll pressures in a rolling mill and in the paralleling of the roll axes. A more specific object is to measure the deflection, caused by the pressure that it is desired to measure, of a portion of a mill housing or other structure which is materially less affected by adjacent temperature changes than the portions whose deflections have been measured heretofore.

In accordance with this invention an electromagnetic strain gauge is mounted on the lower or end beam that connects one end of the side members of a frame-like structure, such as a rolling mill housing. The gauge is of such form that deflection of the beam by the pressure that it is desired to measure will vary an electric circuit connected to a pressure-indicating meter. In the case of a rolling mill, a gauge is mounted on the lower beam of each of its housings and the two gauges are electrically connected to a ratio meter so that the differential in pressure between the two housings may be determined and corrected in order to bring the axes of the rolls into parallelism. The circuits are provided with switches which permit either of the gauges to be disconnected from the ratio meter, as desired, so that the meter will indicate the actual pressure to which the other housing is subjected by the rolls. The gauges could also be connected to individual and independent circuits which would likewise indicate roll parallelism.

Figure 2:
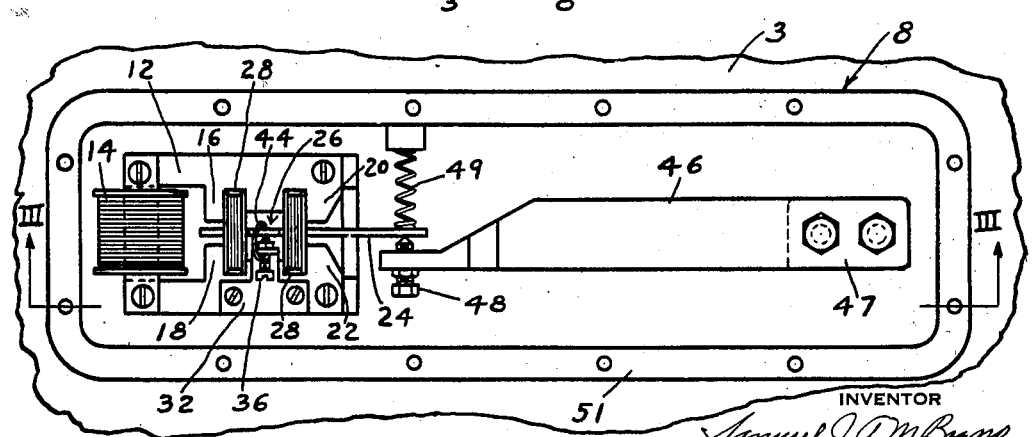
Figure 4:
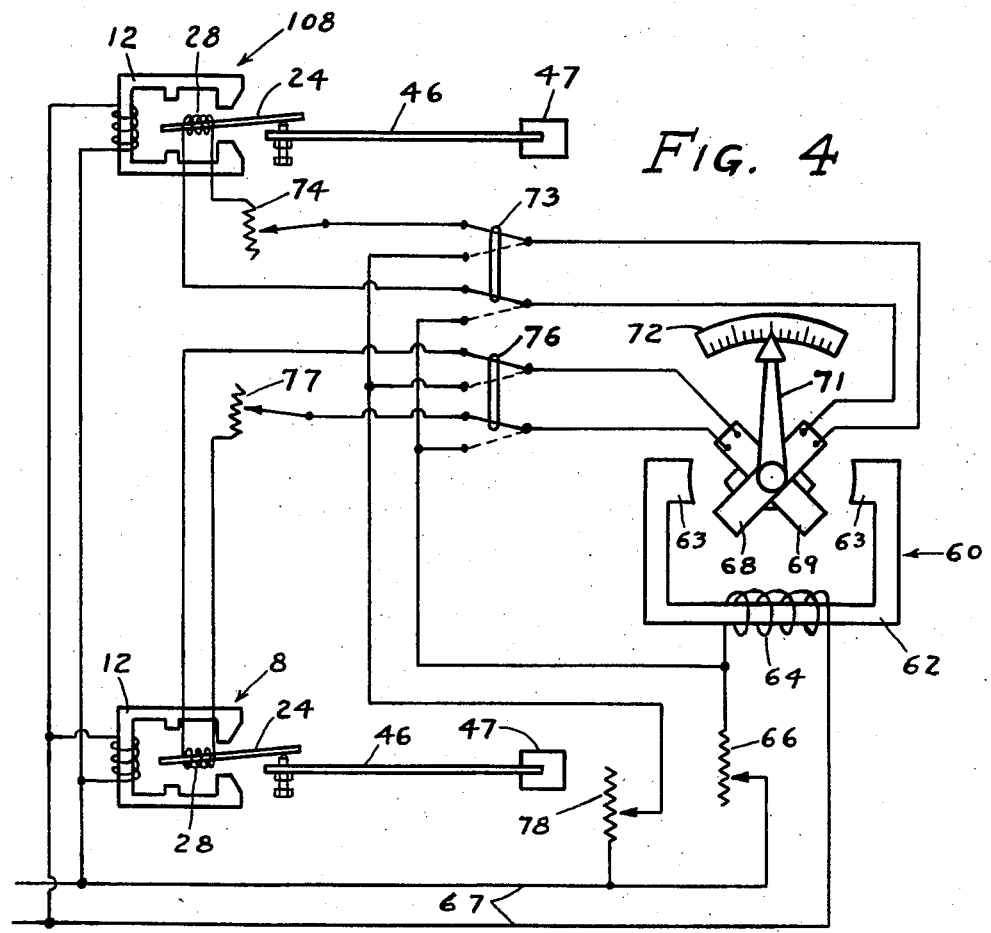
Figure 3:
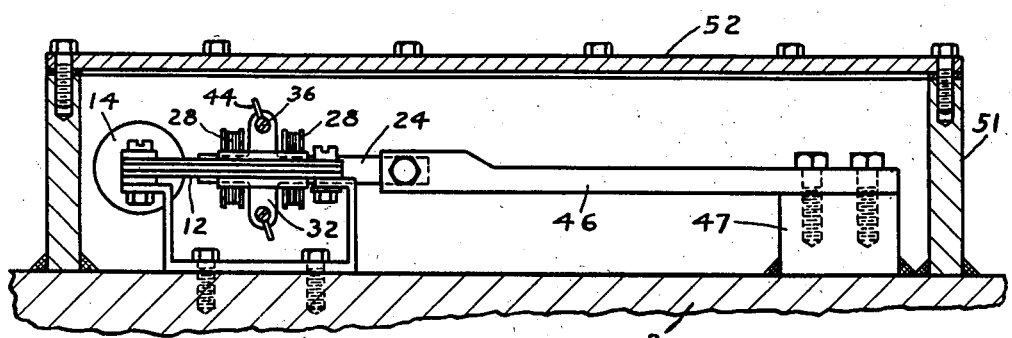

The preferred embodiment of my invention is illustrated in the accompanying drawings in which Fig. 1 is a side view of a rolling mill housing equipped with a strain gauge; Fig. 2 is an enlarged side view of the gauge with its cover removed; Fig. 3 is a bottom view of the gauge taken on the line III—III of Fig. 2; and Fig. 4 is a wiring diagram of two strain gauges connected to a ratio meter.

Referring to Fig. 1 of the drawings, a rolling mill housing of generally rectangular shape is formed from a pair of laterally spaced upright side members or posts I connected at their tops by a horizontal beam 2 and at their bottoms by a transverse beam 3 integral therewith. Vertically adjustable in the housing window are the chucks 4 that carry the rolls 6. The vertical adjustment is effected by means of screw-downs 7 threaded in the upper beam of the housing. When the screws are turned down to press the rolls against each other with great pressure for rolling metal blanks, the reaction to this force tends to force the centers of the upper and lower beams away from each other and to elongate and bow or deflect the side posts I toward each other. The shape that the mill housing thus tends to assume is shown in a greatly exaggerated manner by the broken lines.

To ascertain the pressure exerted by the rolls against each other or against an intervening metal blank, it has been the practice in the past to measure the elongation of the side posts and to do so by so mounting strain gauges on the side posts that the pressure readings are unaffected by the sideways deflection of the posts. But the radiated heat absorbed from the hot work pieces also causes the side posts to bow endways, and the gauges can not be mounted to eliminate the effect of the bowing both sideways and endways. Consequently, a measure of the side post elongation is not always a true indication of the pressure on the housing.

It is a feature of this invention that the roll pressure or its resulting strain on the housing is measured in a manner substantially unaffected by the temperature of the rolls and blank, or by the thermal expansion and contraction of the side posts of the housing. Accordingly, a strain gauge 8 is mounted on the lower beam 3 that connects the side posts below the hot zone of the mill. In this position the gauge is removed a material distance from the high temperature zone of the mill. Although various types of strain gauges might be used, I prefer to use the type shown in the copending application Serial No. 215,302 of Samuel J. A. M. Bagno.

As shown in Figs. 2 and 3, the strain gauge or magnetic micrometer comprises a field core 12 having a magnetizing coil 14 and spaced poles 16, 18, 20 and 22. Disposed between these poles is an armature 24 which is pivotally mounted at 26 and is surrounded by one or more pick-up coils 28. The core 12 is preferably a laminated core made of Invar, or equivalent magnetic material. Invar has a substantially zero temperature coefficient of expansion and it is a magnetic material.

For pivoting the armature the core 12 is provided between poles 18 and 22 with a pair of angle brackets 32 having outwardly projecting horizontal arms (Fig. 3) in which bearing screws 36 with hardened pointed ends or fulcrums are threadedly received. The armature 24 is cruciform in outline, its short cross-arm overlying the bearing screws 36 and being recessed to receive the screw points. The recesses are preferably in the form of broad angled cones the vertex of which is located halfway between the top and bottom of the armature. The armature is held on the bearing points by a pair of spring wires 44 that are C-shaped and held in place by a minute recess or pocket in the upper surface of the armature to receive the upper end of the spring, and a similar pocket in the lower surface of the bracket arm to receive the lower end of the spring.

Although two pick-up coils 28 are shown, they are connected electrically in series and function as a single coil, so it is not essential that they be exactly equal. A single coil may be used if desired. As the coils are wound in the direction of the armature, they are influenced solely by flux flowing longitudinally through the armature. They are disposed at right angles to the field coil 14 and to the flux flowing through the poles 16, 18, 20 and 22, and are therefore uninfluenced thereby. The horizontal arms of the core 12 do not affect the pick-up coils because any effect of the upper arm is neutralized by the equal opposite effect of the lower arm. These arms are so shaped as to provide pockets which snugly receive the top and bottom portions of the pick-up coils. The openings through the coils are large enough to receive the armature and permit movement therof.

It will be seen that the main flow of flux through the field core 12 crosses the gaps between the pairs of poles 16, 18, and 20, 22. With armature 24 in horizontal position, no flux flows through it in a longitudinal direction. However, if the free end of the armature is tilted downwardly as shown in Fig. 4, it is moved nearer the diagonally opposite poles 18 and 20, and a component of field flux flows longitudinally through it from left to right. The quantity of flux flowing through the armature varies with the extent of movement away from mid-position. This variation is linear, for the flux gradient across the air gap between the poles is linear. The amount of movement shown in the drawings is exaggerated. In practice, movements of only a few thousandths of an inch are dealt with.

For tilting the armature a gauge bar 46 is rigidly connected at one end to a boss 47 on the side of the housing's lower beam. This bar projects under the outer end of armature 24 and is provided with an adjustable set screw 48 that bears against the armature. A coil spring 49 presses the armature against this screw at all times. When the lower beam is bowed or deflected downwardly the gauge bar remains substantially stationary, but the gauge core and coils move downwardly, whereby the armature is tilted by the gauge bar.

The entire gauge is surrounded and protected by a casing 51 welded to the beam 3 and having a removable cover 52, as shown in Fig. 3.

Another similar gauge 108 is mounted in the same position on the lower beam of the other roll housing. As shown in Fig. 4, the two gauges are connected to a ratio meter so that the differential in pressure on the two housings will be indicated. The ratio meter 60 is well known, comprising a magnetically permeable yoke 62 having poles 63, and an exciting coil 64 connected by adjustable resistor 66 and electric leads 67 to a source of alternating current. The moving element of the meter includes coils 68 and 69 disposed at right angles to each other and mounted for oscillation in the plane of the yoke. These coils carry a pointer 71 that travels across a stationary dial 72.

Coil 68 is connected through a double pole switch 73 and a variable resistance 74 with pick-up coil 28 of strain gauge 108. Coil 69 is connected through a double pole switch 76 and a variable resistance 77 with pick-up coil 28 of gauge 8. The coils 68 and 69 produce flux components the resultant of which aligns itself with the field flux running between the poles 63 of the yoke 62. Movements of the armatures 24 of gauges 8 and 108 change the flux components and therefore tend to change the angle of the resultant and the pointer 71. However, if the pressure on each mill housing is the same, the change in the flux component caused by one gauge will balance the change effected by the other gauge and the pointer will remain at the center of the dial, thereby showing that there is no pressure differential. If the pressure on one housing is greater than on the other, the pointer will be swung to one side or the other. In such a case the screw-downs are manipulated until the pressure differential is eliminated. In this way the roll axes are brought into parallel.

Moving switch 73 downwardly to the position shown in dotted lines disconnects coil 68 from gauge 108 and connects the coil to leads 67. Resistors 66 and 78 are used for reducing the current to the no stretch value of current from coil 28 of gauge 8 in order to keep the meter pointer at zero on the scale. The meter 60 then serves to indicate the pressure on the roll housing on which gauge 8 is mounted. If switch 73 is left in its full line position and switch 76 is moved into the dotted line position, coil 69 is disconnected from gauge 8 and connected to leads 67, whereby the pressure on the other housing can be measured.

In this way in paralleling the roll axes one of the screw-downs may be operated until a desired roll pressure is obtained in one housing, and then by using both gauges and operating the other screw-down the roll pressure in the other housing may be equalized with the first. The operator thus works with a predetermined and controlled roll pressure, and can not exceed safety limits and break rolls or other parts as would be the case if he worked with a roll paralleling device which shows only the difference in pressures in the housings and does not show the pressures in the housings individually.

The readings given by the meter may be depended upon as being accurate because the beams that actuate the strain gauges are not affected appreciably by the heat incident to the rolling operation.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as spcifically illustrated and described.

I claim:

1. Strain indicating apparatus for use with a rolling mill housing having upright side posts connected at top and bottom by transverse beams subject to being bowed outwardly by roll pressure stress on the housing, said apparatus comprising a field core rigidly connected to the side of the bottom beam and having poles with a gap between them, a field coil for magnetizing said core, a pivoted armature having a part disposed in said gap and so related to said core that a part of the magnetic flux flows longitudinally of the armature, the amount of flux varying with the position of the armature, a pick-up coil surrounding the armature, means rigidly mounted on said beam for varying the position of said armature relative to the core when the beam is bowed under said pressure, and a meter operatively connected to said pick-up coil for indicating the roll pressure stress on said housing.

2. Strain indicating apparatus for use with a rolling mill housing having upright side posts connected at top and bottom by transverse beams subject to being bowed outwardly by roll pressure stress on the housing, said apparatus comprising a field core rigidly connected to the side of the bottom beam and having poles with a gap between them, a field coil for magnetizing said core, an armature pivoted substantially on the vertical center line of the housing, said armature having a part disposed in said gap and so related to said core that a part of the magnetic flux flows longitudinally of the armature, the amount of flux varying with the position of the armature, a pick-up coil surrounding the armature, a gauge bar rigidly connected to said beam in a position substantially unaffected by bowing of the beam, said bar engaging the armature and causing it to tilt when the armature is moved downwardly by the bowing beam, and a meter operatively connected to said pick-up coil for indicating the roll pressure stress on said housing.

SAMUEL J. A. M. BAGNO.